US012483965B2

(12) United States Patent
Chukka

(10) Patent No.: US 12,483,965 B2
(45) Date of Patent: Nov. 25, 2025

(54) ENHANCED MM WAVE COVERAGE USING REFLECTION OR REFRACTION OF THE MM WAVES WITHIN AN ENVIRONMENT

(71) Applicant: T-MOBILE INNOVATIONS LLC, Overland Park, KS (US)

(72) Inventor: Chaitanya Chukka, Carol Stream, IL (US)

(73) Assignee: T-Mobile Innovations LLC, Overland Park, KS (US)

( * ) Notice: Subject to any disclaimer, the term of this patent is extended or adjusted under 35 U.S.C. 154(b) by 364 days.

(21) Appl. No.: 18/184,441

(22) Filed: Mar. 15, 2023

(65) Prior Publication Data

US 2024/0314671 A1  Sep. 19, 2024

(51) Int. Cl.
*H04W 40/20* (2009.01)
*H04W 40/12* (2009.01)

(52) U.S. Cl.
CPC ......... *H04W 40/205* (2013.01); *H04W 40/12* (2013.01)

(58) Field of Classification Search
None
See application file for complete search history.

(56) References Cited

U.S. PATENT DOCUMENTS

| | | | |
|---|---|---|---|
| 2015/0124625 A1* | 5/2015 | Aldrin | H04L 45/42 370/238 |
| 2016/0088521 A1* | 3/2016 | Ho | H04W 40/12 455/453 |
| 2022/0210053 A1* | 6/2022 | Du | H04L 45/02 |
| 2023/0232308 A1* | 7/2023 | Huang | H04W 24/08 370/338 |

FOREIGN PATENT DOCUMENTS

| | | | |
|---|---|---|---|
| EP | 3573415 | * | 3/2018 |
| KR | 20210103600 A | * | 2/2020 |
| WO | WO2023093417 | * | 6/2023 |

* cited by examiner

*Primary Examiner* — Andre Tacdiran
(74) *Attorney, Agent, or Firm* — SHOOK, HARDY & BACON L.L.P.

(57) ABSTRACT

The technology disclosed herein relates to enhanced millimeter (mm) wave coverage based on mm wave interactions with physical objects. For example, the technology disclosed herein can receive and store physical object data for physical objects located within a coverage area provided by antenna elements, which are each within a threshold distance of each other. Further, a location of a user device within the coverage area can be identified. An algorithm (e.g., an adaptive learning algorithm) can be used to determine a mm wave transmission path based on the location of the user device and the physical object data. For example, the algorithm can account for reflections and refractions of the mm wave signal with the physical objects. One or more of the plurality of antenna elements can transmit a mm wave signal for the user device to receive based on the determined mm wave transmission path.

20 Claims, 4 Drawing Sheets

ENHANCED MM WAVE COVERAGE USING REFLECTION OR REFRACTION OF THE MM WAVES WITHIN AN ENVIRONMENT

SUMMARY

A high-level overview of various aspects of the invention is provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter. The present disclosure is directed, in part, to technology associated with enhancing millimeter (mm) wave coverage based on reflection or refraction of a mm wave within an environment having various physical objects, substantially as shown in and/or described in connection with at least one of the figures, and as set forth more completely in the claims.

In aspects set forth herein, and at a high level, the technology described herein relates to determining, using an algorithm (e.g., an adaptive learning algorithm), a mm wave transmission path based on one or more locations of one or more user devices and physical object data of physical objects (e.g., within a portion of a coverage area or within a sector footprint) that are located between a user device and a plurality of antenna elements (e.g., of a base station) for mm wave signal transmissions by the antenna elements. For example, physical objects between the user device and antenna elements can include trees, buildings, vehicles, billboards, another type of physical object, or one or more combinations thereof. As another example, the physical object data of the physical objects can include one or more external materials of one or more surfaces of the physical objects, such as metal, concrete, glass, another type of material, or one or more combinations thereof. The mm wave transmission path can be determined based on one or more mm wave signals reflecting, refracting, or one or more combinations thereof, on one or more of the physical objects. In some embodiments, the antenna elements are configured, based on the determined mm wave transmission path, to transmit one or more mm wave signals in a directional manner using a beamforming technique.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
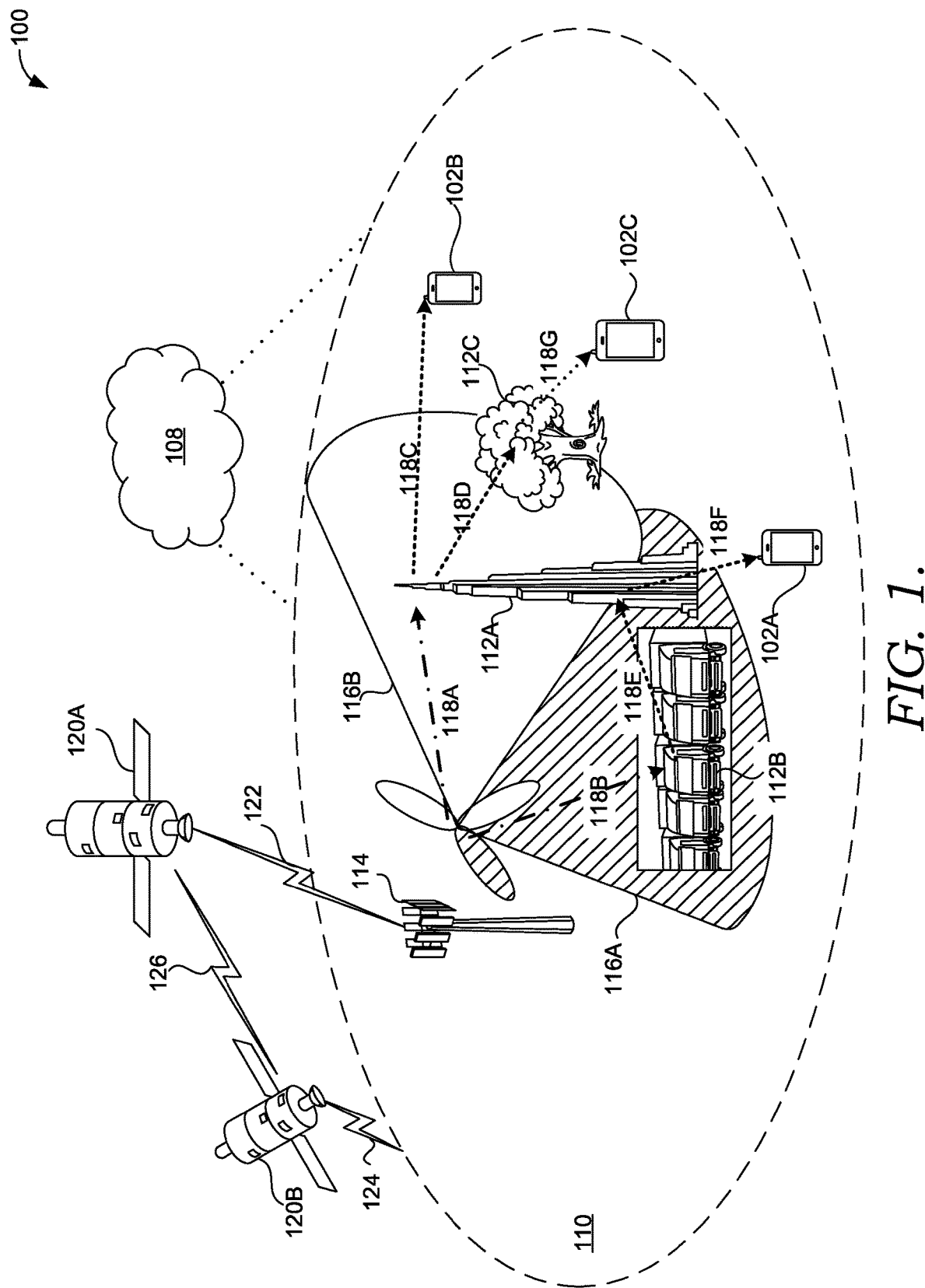
FIG. 1 depicts an example operating environment for determining a millimeter (mm) wave transmission path to a user device, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Cellular Communication System
4G Fourth-Generation Cellular Communication System
5G Fifth-Generation Cellular Communication System
CD-ROM Compact Disk Read Only Memory
CDMA Code Division Multiple Access
eNB Evolved Node B
gNB Next Generation Node B
GPRS General Packet Radio Service
GSM Global System for Mobile communications
DVD Digital Versatile Discs
EEPROM Electrically Erasable Programmable Read Only Memory
E-UTRA Evolved Universal Terrestrial Radio Access
FD-MIMO Full-Dimension Multiple-Input Multiple-Output
GPS Global Positioning System
IoT Internet of Things
LAN Local Area Network
LTE Long Term Evolution
MIMO Multiple-Input Multiple-Output
mm wave Millimeter wave
MME Mobility Management Entity
MU-MIMO Multi-User Multiple-Input Multiple-Output
NR New Radio
PC Personal Computer
PDA Personal Digital Assistant
RAM Random Access Memory
RF Radio-Frequency
ROM Read Only Memory
RSRP Reference Signal Received Power
RSRQ Reference Transmission Receive Quality
RSSI Received Signal Strength Indicator
SNR Signal-to-Noise Ratio
SRS Sound Reference Signal
TDMA Time Division Multiple Access
VLAN Virtual Local Area Network In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Unless specifically stated otherwise, descriptors such as "first," "second," and "third," for example, are used herein without imputing or otherwise indicating any meaning of priority, physical order, arrangement in a list, or ordering in any way, but are merely used as labels to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Further, the term "some" may refer to "one or more." Additionally, an element in the singular may refer to "one or more."

The term "combination" (e.g., one or more combinations thereof) may refer to, for example, "at least one of A, B, or C"; "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.). Other combinations may include more or less than three options associated with the A, B, and C examples.

As used herein, the phrase "based on" shall be construed as a reference to an open set of conditions. For example, an example step that is described as "based on X" may be based on both X and additional conditions, without departing from the scope of the present disclosure. In other words, as used herein, the phrase "based on" shall be construed in the same manner as the phrase "based at least in part on."

The term "mm wave," as used herein, may refer to the extremely high frequency band (e.g., from 30 GHz to 300 GHz). Additionally or alternatively, in some embodiments, a mm wave transmission includes one or more frequency ranges of 24 GHZ, 26 GHZ, 28 GHZ, 39 GHZ, and 52.6-71 GHz.

Additionally, a "user device," as used herein, is a device that has the capability of using a wireless communications network, and may also be referred to as a "computing device," "mobile device," "user equipment," "wireless communication device," or "UE." A user device, in some aspects, may take on a variety of forms, such as a PC, a laptop computer, a tablet, a mobile phone, a PDA, a server, or any other device that is capable of communicating with other devices (e.g., by transmitting or receiving a signal) using a wireless communication. A user device may be, in an embodiment, similar to user devices 102A-102C described herein with respect to FIG. 1.

In embodiments, a user device may include internet-of-things devices, such as one or more of the following: a sensor, controller (e.g., a lighting controller, a thermostat), appliances (e.g., a smart refrigerator, a smart air conditioner, a smart alarm system), other internet-of-things devices, or one or more combinations thereof. Internet-of-things devices may be stationary, mobile, or both. In some aspects, the user device is associated with a vehicle (e.g., a video system in a car capable of receiving media content stored by a media device in a house when coupled to the media device via a local area network). In some aspects, the user device comprises a medical device, a location monitor, a clock, other wireless communication devices, or one or more combinations thereof. In some aspects, the user device is a wearable device having a camera, microphone, RFID, GPS, another sensor, or one or more combinations thereof, to capture data in real-time or near real-time (e.g., one or more strings of text, image data, video data, audio data, location data, other types of data, or one or more combinations thereof).

The wearable devices and other user devices, for example, can transmit the data obtained by their corresponding sensors to other user devices. For example, the sensor data obtained by a user device can be further transmitted for another user device to perform positional tracking (e.g., six degrees of freedom positional tracking) associated with the user device capturing the sensor data in real-time. In embodiments, a user device can access sensors, application data, tracking data, map data, other user device data, or one or more combinations thereof, for packet transmissions to a user device. In some embodiments, a wearable device can be a watch-type electronic device, a glasses-type wearable device, an upper-torso wearable device (e.g., a shirt having sensors affixed on or within the material of the shirt or a device that is attachable to the shirt), another type of wearable device, or one or more combinations thereof.

In aspects, a user device discussed herein may be configured to communicate using one or more of 4G (e.g., LTE), 5G, 6G, another generation communication system, or one or more combinations thereof. In some aspects, the user device has components to establish a 5G connection with a 5G gNB, and to be served according to 5G over that connection. In some aspects, the user device may be an E-UTRAN New Radio-Dual Connectivity (ENDC) device. ENDC allows a user device to connect to an LTE eNB that acts as a master node and a 5G gNB that acts as a secondary node. As such, in these aspects, the ENDC device may access both LTE and 5G simultaneously, and in some cases, on the same spectrum band.

"Wireless telecommunication services" refer to the transfer of information without the use of an electrical conductor as the transferring medium. Wireless telecommunication services may be provided by one or more telecommunication network providers. Wireless telecommunication services may include, but are not limited to, the transfer of information via radio waves (e.g., Bluetooth®), satellite communication, infrared communication, microwave communication, Wi-Fi, mm wave communication, and mobile communication. Embodiments of the present technology may be used with different wireless telecommunication technologies or standards, including, but not limited to, CDMA 1xAdvanced, GPRS, Ev-DO, TDMA, GSM, WiMAX technology, LTE, LTE Advanced, other technologies and standards, or one or more combinations thereof.

A "network" providing the telecommunication services (e.g., network 108 of FIG. 1) may be one or more telecommunications networks, or a portion thereof. The telecommunications network might include an array of devices or components (e.g., one or more base stations). The network can include multiple networks, and the network can be a network of networks. In embodiments, the network or a portion thereof is a core network, such as an evolved packet core, which may include at least one mobility management entity, at least one serving gateway, and at least one Packet Data Network gateway. The mobility management entity may manage non-access stratum (e.g., control plane) functions such as mobility, authentication, and bearer management for other devices associated with the evolved packet core.

In some aspects, a network can connect one or more user devices to a corresponding immediate service provider for services such as 5G and LTE, for example. In aspects, the network provides wireless telecommunication services comprising one or more of a voice service, a message service (e.g., SMS messages, MMS messages, instant messaging messages, an EMS service messages), a data service, other types of wireless telecommunication services, or one or more combinations thereof, to user devices or corresponding users that are registered or subscribed to a telecommunication service provider to utilize the one or more services. The network can comprise any communication network providing voice, message, or data service(s), such as, for example, a 1× circuit voice, a 3G network (e.g., CDMA, CDMA2000, WCDMA, GSM, UMTS), a 4G network (WiMAX, LTE, HSDPA), a 5G network, a 6G network, another generation network, or one or more combinations thereof.

Components of the telecommunications network, such as terminals, links, and nodes (as well as other components), can provide connectivity in various implementations. For example, components of the network may include core network nodes, relay devices, integrated access and backhaul nodes, macro eNBs, small cell eNBs, gNBs, relay base stations, other network components, or one or more combinations thereof. The network may interface with one or more base stations through one or more wired or wireless backhauls. As such, the one or more base stations may communicate to devices via the network or directly. Furthermore, user devices can utilize the network to communicate with other devices (e.g., a user device(s), a server(s), etc.) through the one or more base stations.

As used herein, the term "base station" (used for providing UEs with access to the telecommunication services) generally refers to one or more base stations, nodes, RRUs control components, and the like (configured to provide a wireless interface between a wired network and a wirelessly connected user device). A base station may comprise one or more nodes (e.g., eNB, gNB, and the like) that are configured to communicate with user devices. In some aspects, the base station may include one or more band pass filters, radios, antenna arrays, power amplifiers, transmitters/receivers, digital signal processors, control electronics, GPS equipment, and the like. A base station may be, in an embodiment, similar to base station 114 described herein with respect to FIG. 1.

For example, the base station may refer to a base transceiver station, a radio base station, an access point, a radio transceiver, a NodeB, an eNB, a gNB, a Home NodeB, a Home eNodeB, another type base station, or one or more combinations thereof. A node corresponding to the base station may comprise one or more of a macro base station, a small cell or femtocell base station, a relay base station, another type of base station, or one or more combinations thereof. In aspects, the base station may be configured as FD-MIMO, massive MIMO, MU-MIMO, cooperative MIMO, 3G, 4G, 5G, another generation communication system, or one or more combinations thereof. In addition, the base station may operate in an extremely high frequency region of the spectrum (e.g., from 30 GHz to 300 GHz), also known as the millimeter band.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, prior relevant technologies have had drawbacks associated with providing mm wave transmissions. For example, prior relevant technologies providing telecommunication services via mm wave signals have increased signal attenuation (e.g., blockage loss, path loss, penetration loss) based on propagation environments and densities of blockages. For instance, dense urban areas have many blockages that increase signal fading, which results in performance degradation, thereby further resulting in handoff to other frequency bands or dropped calls within a standalone environment. As one example, an impact on throughput can occur around −95 dBm in terms of RSRP measurements.

The technology provided herein can alleviate the problems discussed above. For example, the technology disclosed herein decreases signal attenuation, decreases signal fading, and increases uplink and downlink throughput by determining mm wave transmission paths based on mm wave signal reflections and refractions that occur in an urban environment. In addition, the technology disclosed herein can improve communications between or among user devices by improving quality of service and user experience. Further, the technology and corresponding techniques can enhance the reliability and functionality of communications.

In an embodiment, a system is provided for enhancing mm wave coverage within a wireless telecommunication network. The system comprises one or more processors communicatively coupled with a plurality of antenna elements that provide a coverage area and computer memory storing computer-usable instructions that, when executed by the one or more processors, cause the system to perform operations. The operations comprise receiving physical object data for physical objects within a coverage area provided by the plurality of antenna elements. The operations also comprise identifying a location of a user device within the coverage area. The operations further comprise determining, using an algorithm, a mm wave transmission path based on the location of the user device and the physical object data for the physical objects within the coverage area. The operations also comprise transmitting a mm wave signal for the user device to receive based on the determined mm wave transmission path.

In another embodiment, a method is provided for enhancing mm wave coverage within a wireless telecommunication network. The method comprises receiving physical object data for physical objects within a coverage area provided by a plurality of antenna elements, each the plurality of antenna elements within a threshold distance from at least one of the plurality of antenna elements. The method also comprises identifying a location of a user device within the coverage area. The method also comprises determining, using an adaptive learning algorithm, a first mm wave transmission path and a second mm wave transmission path based on the location of the user device and the physical object data for the physical objects within the coverage area. The method also comprises transmitting first mm wave signal and a second mm wave signal for the user device to receive, the first mm wave transmitted based on the first mm wave transmission path and the second mm wave transmitted based on the second mm wave transmission path.

In another yet embodiment, a method is provided for enhancing mm wave communications between user devices within a wireless telecommunication network. The method comprises receiving physical object data for physical objects within a coverage area provided by the wireless telecommunication network, wherein the physical objects are located between a first user device and a second user device. The method also comprises identifying a location of the first user device and the second user device within the coverage area. The method also comprises determining, using an adaptive learning algorithm, a mm wave transmission path based on the location of the user devices and the physical object data for the physical objects between the first user device and the second user device. The method also comprises transmitting one or more mm wave signals from the first user device to the second user device based on the mm wave transmission path determined.

Another embodiment includes one or more non-transitory computer storage media having computer-executable instructions embodied thereon, that when executed by at least one processor, cause the at least one processor to perform a method. The method comprises identifying a location of a user device within a coverage area provided by a plurality of antenna elements, each the plurality of antenna elements within a threshold distance from at least one of the plurality of antenna elements. Based on identifying the user device, the method also comprises retrieving, from a database, physical object data for physical objects within the coverage area. The method also comprises determining, using an algorithm, a mm wave transmission path based on the location of the user device and the physical object data retrieved from the database. The method also comprises transmitting a mm wave signal based on the determined mm wave transmission path.

Those skilled in the art will appreciate that the computing devices described herein need not be limited to conventional personal computers, and can include other computing configurations, including servers, hand-held devices, multi-processor systems, a microprocessor based or programmable consumer electronics, network PCs, minicomputers, mainframe computers, other computing devices, or one or more combinations thereof. Similarly, the computing devices need not be limited to stand-alone computing devices, as the mechanisms may also be practiced in distributed computing environments where tasks are performed by remote processing devices that are linked through a wireless telecommunications network. In a distributed computing environment, program modules may be located in both local and remote memory storage devices.

Turning now to FIG. 1, example environment 100 supports the enhancing mm wave coverage based on one or more reflections, refractions, or one or more combinations thereof, of one or more mm wave signals within a wireless telecommunications network, in accordance with one or more embodiments disclosed herein. Example environment 100 is but one example of a suitable environment for the improved mm wave coverage techniques disclosed herein, and is not intended to suggest any limitation as to the scope of use or functionality of the invention. Neither should the environment 100 be interpreted as having any dependency or requirement relating to any one or combination of components illustrated.

Example environment 100 includes user devices 102A-102C, network 108, coverage area 110, base station 114, sectors 116A and 116B (not drawn to scale, for example, the user devices are illustrated as outside the sectors but can be within them) within coverage area 110, mm wave signals 118A and 118B from antenna elements of base station 114, reflected mm wave signals 118C and 118D from skyscraper physical object 112A, reflected mm wave signal 118E from vehicle physical object 112B, reflected mm wave signal 118F from the skyscraper physical object 112A, refracted mm wave signal 118G from tree physical object 112C, satellites 120A and 120B, communication link 124 corresponding to satellite 120B and communication link 122 corresponding to satellite 120A, and communication link 126 between satellites 120A and 120B.

Example environment 100 having network 108 and coverage area 110 may be associated with one or more of a non-terrestrial network, an LTE network, an LTE-A network, an LTE-A Pro network, an NR network, a mm wave network, another type of network, or one or more combinations thereof. In some embodiments, the example environment 100 may support enhanced broadband communications, ultra-reliable (e.g., mission critical) communications, low latency communications, communications with low-cost and low-complexity devices, another type of communication, or one or more combinations thereof. In some embodiments, one or more of the mm wave signals 118A-118G may correspond to the enhanced broadband communication, ultra-reliable communication, low latency communication, another type of communication, or one or more combinations thereof.

In embodiments, example environment 100 can utilize both licensed and unlicensed radio frequency bands. For example, the example environment 100 may employ License Assisted Access, LTE-Unlicensed radio access technology, or NR technology in an unlicensed band (e.g., 5 GHz industrial, scientific, and medical band). When operating in unlicensed radio frequency bands, base stations, satellites, or user devices may employ carrier sensing for collision avoidance and detection. In some examples, operations in unlicensed bands may be based on a carrier aggregation configuration and component carriers operating in a licensed band. Operations in unlicensed spectrum may include downlink transmissions, uplink transmissions, P2P transmissions, D2D transmissions, another type of unlicensed spectrum operation, or one or more combinations thereof. As such, one or more of the mm wave signals 118A-118G may correspond to a licensed or unlicensed radio frequency band, a 5 GHz industrial band, a 5 GHz scientific band, a 5 GHz medical band, a particular carrier aggregation configuration of a licensed band, a P2P transmission, a D2D transmission, another type of spectrum operation, or one or more combinations thereof.

In embodiments, user devices 102A-102C may wirelessly communicate via one or more wireless telecommunication services provided by one or more base stations (e.g., base station 114), one or more satellites (e.g., satellites 120A and 120B), other types of wireless telecommunication devices, or one or more combinations thereof. In example environment 100, network 108, base station 114, and satellites 120A-120B can provide coverage area 110 for supporting communication signals according to one or more radio access technologies. Supported communication signals within coverage area 110 can include MU-MIMO and SU-MIMO transmissions, for example. As such, one or more of the mm wave signals 118A-118G may correspond to the wireless telecommunication services provided within coverage area 110.

In embodiments, the user devices 102A-102C can be stationary, mobile, or one or more combinations thereof at different times. The user devices 102A-102C may be able to communicate with various types of devices, such as other UEs, various types of base stations, or various types of network equipment (e.g., core network nodes, relay devices, integrated access and backhaul nodes, other network equipment, or one or more combinations thereof). In embodiments, one or more of the user devices 102A-102C may have different capabilities. For instance, a user device can be wearable devices having a camera, microphone, RFID, GPS, another sensor, or one or more combinations thereof. In some embodiments, a user device is a wearable device can be a watch-type electronic wearable device, a glasses-type wearable device, an upper-torso wearable device (e.g., a shirt having sensors affixed on or within the material of the shirt or a device that is attachable to the shirt), another type of wearable device, or one or more combinations thereof.

In embodiments, one or more of the user devices 102A-102C may include one or more of a unit, a station, a terminal, or a client, for example. The user devices 102A-102C may also include a wireless local loop station, an IoT device, an Internet of Everything device, a machine type communication device, an evolved or enhanced machine type communication device, another type of user device, or one or more combinations thereof. The machine type communication device or the evolved or enhanced machine type communication device may include, for example, one or more robots, drones, remote devices, sensors, meters, monitors, location tags, etc., that may communicate with a base station, another device (e.g., remote device), or some other entity. In some embodiments, a user device may be implemented in various objects such as appliances, vehicles, meters, or other objects. In some embodiments, one or more of the user devices 102A-102C may, at one time or another, act as a relay, base station, (e.g., a UAV acting as an aerial base station), or the network equipment (e.g., macro eNBs or gNBs, small cell eNBs or gNBs, or relay base stations). As such, in other embodiments, one or more of the mm wave signals 118A-118G may be received by or transmitted from the unit, station, terminal, client, a wireless local loop station, an IoT device, an Internet of Everything device, a machine type communication device, an evolved or enhanced machine type communication device, a user device implemented in an object, another type of user device, or one or more combinations thereof.

Coverage area 110 can provide services from network 108, such as network provider services including the Internet, Intranet, Internet Protocol Multimedia Subsystem, Packet-Switched Streaming Service, another type of network provider service, or one or more combinations thereof. In embodiments, the user devices 102A-102C, base station 114, and satellites 120A-120B can be configured to support ultra-reliable communications, low-latency communications, mission critical communications, ultra-reliable low-latency communications, ultra-reliable functions, low-latency functions, critical functions, mission critical push-to-talk functions, mission critical video functions, other types of communications, or one or more combinations thereof, associated with the mm wave signals 118A-118G. In addition, the one or more of the mm wave signals 118A-118G may correspond to a network provider service (e.g., Internet, Intranet, Internet Protocol Multimedia Subsystem, Packet-Switched Streaming Service).

In embodiments, one or more of the user devices 102A-102C, the base station 114, or another network component (e.g., an MME), or one or more combinations thereof, may have one or more processors capable of processing physical object data, user device location data, weather data (e.g., humidity data, ultraviolet data, temperature data), ultra-reliable data, low-latency data, critical data, other types of data corresponding to mm wave signals 118A-118G, or one or more combinations thereof. In some embodiments, the one or more processors may include a system-on-a-chip, a processor core, a graphics processor unit, a central processing unit, an accelerator (e.g., a digital signal processor, a graphics accelerator, a compression accelerator, an artificial intelligence accelerator), a chipset processor, a general-purpose processor, a general-purpose graphics processor unit, an accelerated processing unit, a field-programmable gate array, a neural network processing unit, a data processor unit, a controller, another type of processor or processor unit, or one or more combinations thereof. In some embodiments, a processor unit may be located in a single integrated circuit component (e.g., multi-chip module) or in separate integrated circuit components.

Base station 114 and satellites 120A-120B may communicate with the wireless telecommunications network 108 via a core network, one or more network components (e.g., a core network node, a relay device, an MME, an integrated access and backhaul node, a macro eNB, a small cell eNB, a gNB, a relay base station), or one or more combinations thereof. In some embodiments, the base station 114, satellite 120A, satellite 120B, or one or more combinations thereof, communicates with the wireless telecommunications network 108 over one or more backhaul links (e.g., via an X2, Xn, or other interface) either directly (e.g., directly between base stations), or indirectly (e.g., via core network), or one or more combinations thereof. The backhaul links may be or include one or more wireless links, for example. As such, one or more of the mm wave signals 118A-118G can correspond to one or more communications from one or more of base station 114, satellite 120A, satellite 120B, or one or more combinations thereof.

In embodiments, base station 114 may operate using MIMO transmissions. For example, the base station 114 can be configured as FD-MIMO, massive MIMO, MU-MIMO, cooperative MIMO, 4G, 5G, another generation communication system, or one or more combinations thereof, for providing telecommunication services to one or more of user devices 102A-102C via mm waves 118A-118G. The base station 114 can perform one or more of the following functions: transfer user data, radio channel ciphering and deciphering, integrity protection, header compression, mobility control functions (e.g., handover, dual connectivity), inter-cell interference coordination, connection setup and release, load balancing, distribution for a non-access stratum message or node selection, a synchronization, radio access network sharing, multimedia broadcast multicast service, subscriber and equipment trace, radio access network information management, paging, positioning, delivery of warning messages, other functions, or one or more combinations thereof. As such, one or more of the mm wave signals 118A-118G may be associated with the FD-MIMO, massive MIMO, MU-MIMO, cooperative MIMO, 4G, 5G, another generation communication system, one or more of the corresponding functions of such system, or one or more combinations thereof.

In some embodiments, one or more base station antennas (or antenna arrays) having antenna elements may be co-located at an antenna assembly, such as an antenna tower. In some examples, antennas or antenna arrays associated with base station 114 may be located in diverse geographic locations. In embodiments, antenna elements of one or more antennas may each be within a threshold distance from at least one of the other antenna elements. In some aspects, one or more nodes corresponding to base station 114 may comprise one or more macro cells, one or more small cells, one or more relay base stations, one or more repeaters, one or more femtocells, other types of cells, or one or more combinations thereof. In other embodiments, base station 114 may be movable, thereby providing communication coverage for a moving geographic coverage area 110. In some embodiments, one or more antennas of base station 114 may use MIMO antenna technology, including spatial multiplexing, beamforming, transmit diversity, other MIMO functions, or one or more combinations thereof.

Satellites 120A-120B may communicate with base station 114, user devices 102A-102C, or other high altitude or terrestrial communications devices. For example, the satellites 120A-120B may communicate using mm wave signals. "Satellite" may also be referred to as a space vehicle or communication satellite. Satellites 120A-120B may be any suitable type of communication satellite configured to relay communications between different end nodes in a wireless communication system. Satellites 120A-120B may be or include a space satellite, a balloon, a dirigible, an airplane, a drone, an unmanned aerial vehicle, another type of satellite, or one or more combinations thereof. In some examples, the satellites 120A-120B may be in a geosynchronous or geostationary earth orbit, a low earth orbit, a medium earth orbit, another type of orbit, or one or more combinations thereof. In some embodiments, satellites 120A-120B may be a multi-beam satellite configured to provide service for multiple service beam coverage areas in a predefined geographical service area (e.g., coverage area 110). The satellites 120A-120B may be any distance away from the surface of the earth.

In some embodiments, satellites 120A-120B may be deployed at an altitude of 18 km to 25 km (e.g., a geostationary balloon satellite), wherein the stratosphere has low wind speeds (e.g., 5 m/s to 40 m/s) and low turbulence. In embodiments, satellites 120A and 120B may be configured to communicate with each other (e.g., via communication link 126). As such, the communication link 126 may include a free space optical link, a microwave link, electromagnetic wave signals via mm wave signals, optical signals via a laser, another type of communication link, or one or more combinations thereof. In embodiments, satellites 120A-120B may be configured to communicate via a wireless common public radio interface protocol, a dedicated wireless front haul protocol developed for high-altitude-to-high-altitude, another protocol, or one or more combinations thereof.

In some embodiments, one or more portions of coverage area 110 may be provided or established by satellites 120A-120B as part of a non-terrestrial network. Satellites 120A-120B may, in some cases, perform the functions of base station 114 or may act as a bent-pipe satellite, act as a regenerative satellite, act as another type of satellite, or one or more combinations thereof. In other cases, satellites 120A-120B may be a smart satellite, or a satellite with intelligence. For example, a smart satellite may be configured to perform more functions than a regenerative satellite (e.g., may be configured to perform particular algorithms beyond those used in regenerative satellites or to be reprogrammed, for example). A bent-pipe transponder or satellite may be configured to receive signals from ground base stations (e.g., base station 114) and transmit those signals to different ground base stations. In some embodiments, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, another type of satellite or regenerative transponder function, or one or more combinations thereof. For example, a bent-pipe satellite may receive a signal from a base station and may relay the signal to a user device or base station, or vice-versa.

In embodiments, base station 114 provides sectors 116A and 116B within coverage area 110. In some embodiments, one or more of satellites 120A and 120B may provide sectors 116A and 116B. In example environment 100, antenna elements of base station 114 provide mm wave signals 118A and 118B. The mm wave signals 118C and 118D reflect from skyscraper physical object 112A. The mm wave signal 118C is received by user device 102B. The mm wave signal 118G refracts from tree physical object 112C and is received by user device 102C. The mm wave signal 118E is reflected from vehicle physical object 112B, and the mm wave signal 118F is reflected from the skyscraper physical object 112A and received by user device 102A. In some embodiments, one or more of mm wave signals 118A-118G include a plurality of mm wave signals.

In some embodiments, mm wave signals 118C, 118D, and 118F reflected from skyscraper physical object 112A are transmitted from the antenna elements based on one or more of an incident angle, reflection angle, antenna power of the base station 114 antenna elements transmitting the associated mm wave signal, separation distance between the associated user device and skyscraper physical object 112A, separation distance between the antenna elements and the skyscraper physical object 112A, locations of the associated user device and antenna elements, an external temperature associated with the environment in which the mm wave signal transmitted from the antenna elements to the user device, a humidity level of the environment in which the mm wave signal was transmitted, precipitation within the environment, velocity of the mm wave signal transmitted by the antenna elements, a predicted velocity of the mm wave signal received by the associated user device, displacement amplitude, intensity associated with the mm wave signal at transmission, a predicted intensity of the mm wave signal received by the associated user device, one or more capabilities of the associated user device, permittivity of the reflective surface of the skyscraper physical object 112A in which the mm wave signal reflected, predicted reflection coefficients, a predicted reflection loss, a mm wave signal pattern, predicted partition loss, other types of data, or one or more combinations thereof. For example, the transmission of the mm wave signals 118C, 118D, and 118F can be determined using an adaptive learning algorithm and applying the algorithm to this data (e.g., incident angle, reflection angle, separation distance between the associated user device and skyscraper physical object 112A) to determine a mm wave transmission path.

In some embodiments, the mm wave transmission path associated with mm wave signal 118G (118A-118D-118G) and received by user device 102C can be determined using the adaptive learning algorithm. For example, the mm wave transmission path can be determined using one or more of an incident angle associated with the antenna elements of base station 114 and the reflection location on the skyscraper physical object 112A, the material of the external surface of the skyscraper physical object 112A associated with the reflection location, a density of the external surface of the skyscraper physical object 112A associated with the reflection location, an altitude or height of the skyscraper physical object 112A, a surface area associated with the skyscraper physical object 112A and the reflection location, a predicted reflection angle from the skyscraper physical object 112A, a predicted refraction angle associated with the mm wave signal 118D and mm wave signal 118G, the material of the external surface of the tree physical object 112C associated with the refraction location (e.g., wood, leaves, type of wood), a density of the tree physical object 112C associated with the refraction location, an altitude or height of the tree physical object 112C, a texture associated with the tree physical object 112C and the refraction location, antenna power of the antenna elements transmitting the one or more mm wave signals, separation distance between the user device 102C and tree physical object 112C, separation distance between the user device 102C and skyscraper physical object 112A, receiving capabilities of the user device 102C, separation distance between the user device 102C and antenna elements of base station 114, separation distances between the antenna elements and each of the skyscraper physical object 112A and tree physical object 112C, user device 102C location data, a temperature associated with the environment in which the mm wave signal travels, a humidity level associated with the environment in which the mm wave signal travels, other environmental data associated with the environment in which the mm wave signal travels, intensity associated with the mm wave signal at transmission from the base station 114, signal pattern associated with the mm wave signal transmitted, permittivity of the reflective surface of the tree physical object 112C in which the mm wave signal refracted, permittivity of the reflective surface of the skyscraper physical object 112A in which the mm wave signal reflected, another type of physical object data, another type of mm wave property data, or one or more combinations thereof.

In some embodiments, the mm wave transmission path associated with user device 102A receiving mm wave signal 118F (118B-118E-118F) can be determined using the adaptive learning algorithm. For example, the mm wave transmission path can be determined using one or more of an incident angle associated with the antenna elements of base station 114 and the reflection location on the vehicle physical object 112B, the material of the external surface of the vehicle physical object 112B associated with the reflection location (e.g., glass, paint type, metal), a density of the external surface of the vehicle physical object 112B associated with the reflection location, an altitude or height of the vehicle physical object 112B, a surface area and dimensions of the surface area associated with the vehicle physical object 112B and the reflection location, a predicted reflection angle from the skyscraper physical object 112A, a predicted reflection angle associated with the vehicle physical object 112B, the material of the external surface of the skyscraper physical object 112A associated with the reflection location (e.g., glass, metal, concrete), a density of the material of the skyscraper physical object 112A associated with the reflection location, an altitude or height of the skyscraper physical object 112A, a texture associated with the skyscraper physical object 112A and the reflection location, antenna power of the antenna elements transmitting the one or more mm wave signals, separation distance between the user device 102A and skyscraper physical object 112A, separation distance between the user device 102A and vehicle physical object 112B, receiving capabilities of the user device 102A, separation distance between the user device 102A and antenna elements of base station 114, separation distances between the antenna elements and each of the skyscraper physical object 112A and vehicle physical object 112B, user device 102A location data, a temperature associated with the environment in which the mm wave signal travels, a humidity level associated with the environment in which the mm wave signal travels, other environmental data associated with the environment in which the mm wave signal travels, intensity associated with the mm wave signal at transmission from the base station 114, signal pattern associated with the mm wave signal transmitted, permittivity of the reflective surface of the vehicle physical object 112B in which the mm wave signal reflected, permittivity of the reflective surface of the skyscraper physical object 112A in which the mm wave signal reflected, another type of physical object data, another type of mm wave property data, or one or more combinations thereof.

In embodiments, the adaptive learning algorithm can learn from feedback received by one of the user devices 102A-102C. For example, feedback data may include a delay between transmission and receipt associated with the mm wave signal, velocity of the mm wave signal received by the user device, displacement amplitude, intensity of the mm wave signal received by the user device, measured reflection coefficients, reflection loss, refraction loss, partition loss, SRS, RSRP measurements, other types of feedback, or one or more combinations thereof. In some embodiments, the mm wave transmission path can be adjusted using the adaptive learning algorithm and the feedback received, such as the SRS, the RSRP measurement, additional physical object data (e.g., the window of a building being open), or one or more combinations thereof.

Figure 2:
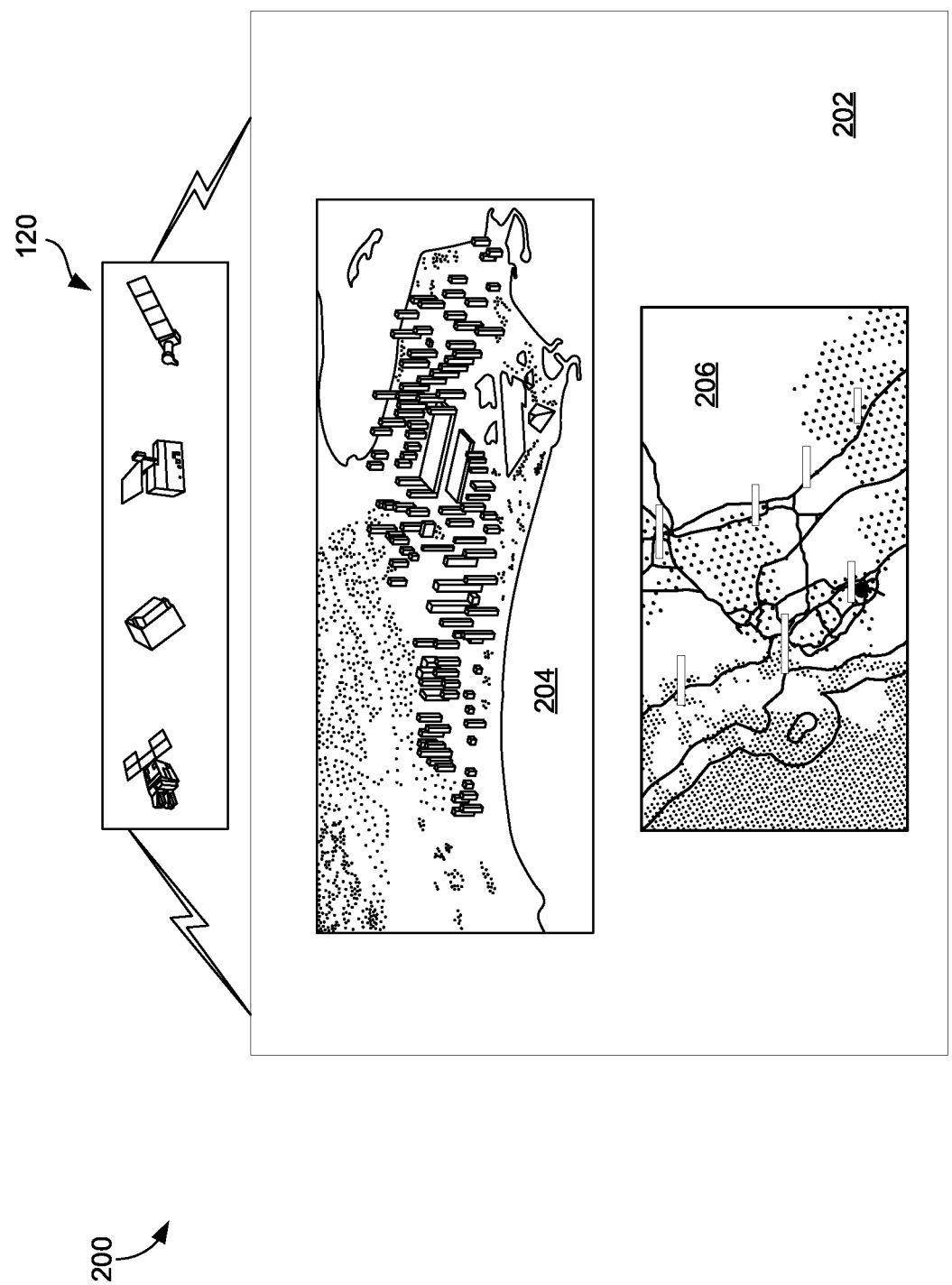
FIG. 2 depicts another example operating environment for determining a mm wave transmission path using the physical object data, in accordance with aspects herein.

FIG. 2 depicts example operating environment 200 for determining a mm wave transmission path using physical object data. Example operating environment 200 includes a plurality of satellites 120, an urban terrain modeling map 204 comprising physical object data stored within database 202, and another urban terrain modeling map 206 comprising physical object data stored within database 202. Example operating environment 200 is but one example of a suitable environment for the improved mm wave coverage techniques disclosed herein, and is not intended to suggest limitation as to the scope of use or functionality of the invention. For example, in some embodiments, database 202 is a distributed database that stores the physical object data across one or multiple locations (e.g., different storage nodes) including a relational system, non-relational system, or one or more combinations thereof.

In embodiments, database 202 storing the physical object data (e.g., associated with physical objects 112A-112C of FIG. 1) may be accessible by one or more user devices, one or more base stations, one or more network components, one or more satellites, or one or more combinations thereof (e.g., based on an authentication procedure). In some embodiments, the physical object data may be obtained from one or more of the plurality of satellites 120. For example, one or more of the satellites 120 may be an Albedo satellite, a WorldView satellite, a GeoEye satellite, a QuickBird satellite, a SuperView satellite, a Pelican satellite, a Pleiades satellite, another type of satellite, or one or more combinations thereof. In some embodiments, the physical object data is stored in one or more tables based on physical object material data, such as external material of the physical objects. For example, the physical object data can be labeled based on external material type and can have one or more associated reflection or refraction indexes. As another example, urban terrain modeling map 206 can include physical object data associated with roads, such as road material, road obstructions, blockings along each road (e.g., poles, vehicles), widths of the roads, lengths of the roads, positioning of the roads, temperatures of the roads throughout times of each day, precipitation on the roads, other associated physical object data, or one or more combinations thereof. In another example, urban terrain modeling map 206 can also include cloud density data associated with a particular atmospheric range, temperatures at various altitudes associated with a particular geographic region and coverage area, precipitation data associated with the coverage area, humidity data associated with the coverage area, other environmental data, or one or more combinations thereof.

In embodiments, the physical object data associated with urban terrain modeling map 204 may include locations and positions of buildings within a coverage area, heights of each building within the coverage area, location data and position data associated with buildings being constructed or buildings under construction, one or more surface areas for one or more surfaces of the buildings and other physical objects, angles and slopes of a hill or a mountain within the coverage area, external material that the physical objects have (e.g., wood, concrete, metal, plastic), a texture of the external material, other material associated with a particular reflection or refraction location on the physical object (e.g., wood located behind cement), a thickness of the external material, a thickness of material coupled to the external material, a refractive index associated with a particular refraction location on a physical object, other types of physical object data, or one or more combinations thereof. The database 202 can be updated periodically or a-periodically. In some embodiments, the database 202 is updated based on a triggering event (e.g., detection of a demolition of a building, detection of a vehicle moving within a particular mm wave transmission path).

Example Flowchart

Figure 3:
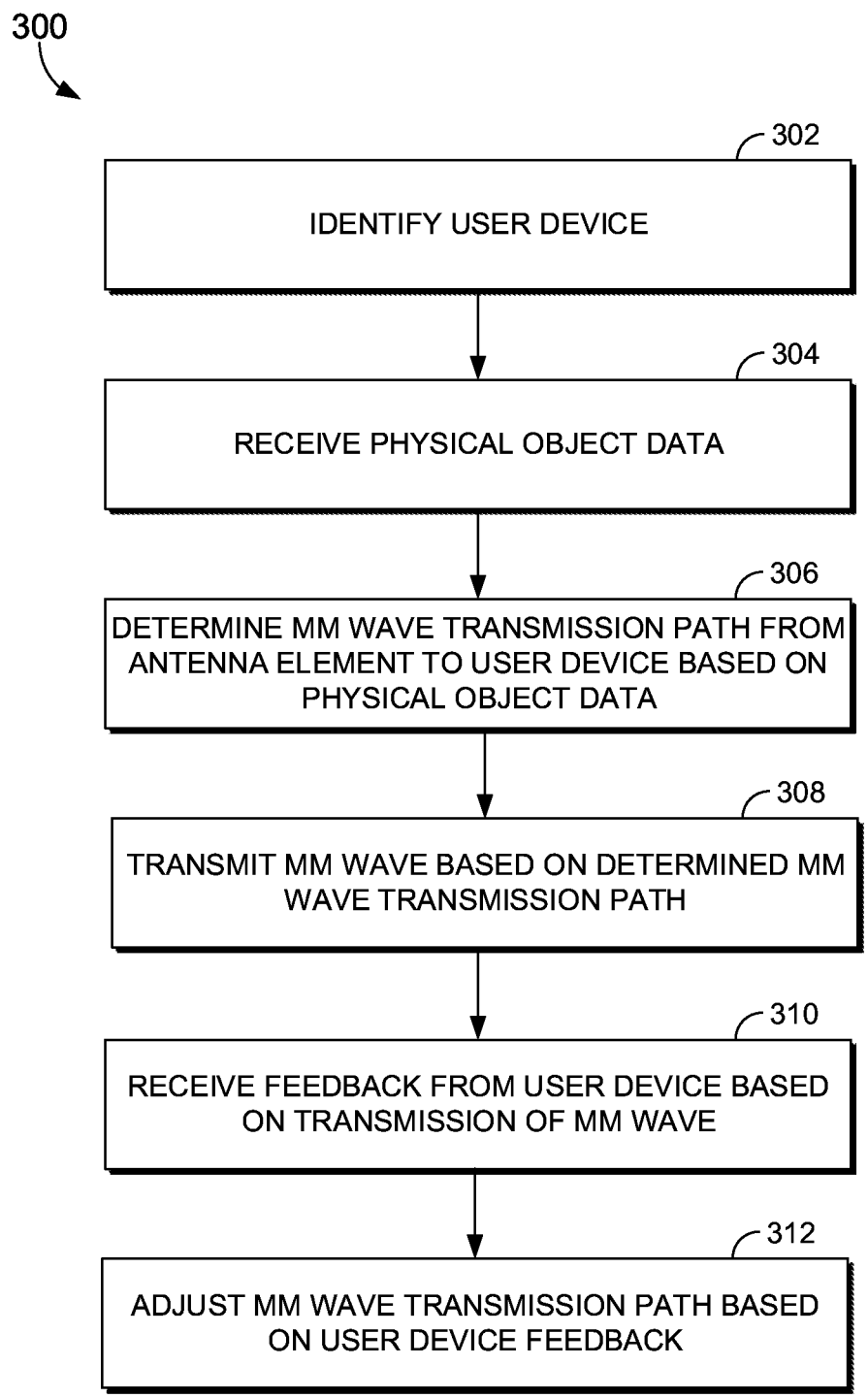
FIG. 3 illustrates an example flowchart for determining the mm wave transmission path, in accordance with aspects herein.

Having described the example embodiments discussed above, an example flowchart is described below with respect to FIG. 3. Example flowchart 300 begins at 302 with identifying a user device. For example, a user device may request access to a telecommunication service (e.g., email, a message service, (e.g., SMS messages, MMS messages, instant messaging messages, an EMS service messages), an application service, a data service, other types of wireless telecommunication services, or one or more combinations thereof, and the user device can thereby be identified based on one or more of these requests. In some embodiments, location data for the user device is identified or determined. For example, the location data may comprise GPS or other satellite location services data, terrestrial triangulation data, an access point location data associated with a user device, other location data, or one or more combinations thereof. The location data may indicate one or more geographic locations of one or more of a user device, an antenna or antenna array of a base station or satellite, a coverage area, a sector associated with a coverage area, a sector footprint associated with a coverage area, or one or more combinations thereof. In some embodiments, the user device is identified based on a mobile device number, a request for a webpage, an authentication request, a transition of the user device from one sector of a coverage area to another sector of a coverage area, another type of request or transition, or one or more combinations thereof.

At 304, physical object data is received for a plurality of physical objects located between a user device and antenna elements (e.g., that are each within a threshold distance from at least one of the other antenna elements at a fixed location). For example, the physical object data may include one or more surface areas for one or more surfaces of the physical objects, external material that the physical objects have (e.g., concrete, metal, paint), a texture of the external material, other material associated with a particular refraction location on the physical object (e.g., drywall located behind brick), a thickness of the external material, a thickness of material coupled to the external material, a refractive index associated with a particular refraction location on a physical object, coordinates (e.g., a height, width, length, altitude, depth, or one or more combinations thereof) associated with the physical object, coordinates associated with one or more surface areas of the physical object, other types of physical object data, or one or more combinations thereof.

For example, the physical object data may comprise location data (e.g., the coordinates associated with the physical object data) and external material data for each of the physical objects located within a coverage area provided by the antenna elements. In some embodiments, the physical object data comprises external material data for each of the physical objects and surface area dimensions for each external surface of each of the physical objects. In some embodiments, a first physical object has a first external material (e.g., a particular type of plastic), which is identifiable from the physical object data, wherein the first external material is different from a second external material (e.g., a particular type of metal) of a second physical object. The physical object data can be stored at and retrieved from a database that may be communicatively coupled with the user device, other user devices, a base station, a satellite, another type of device, or one or more combinations thereof.

At 306, a mm wave transmission path is determined based on identifying the user device (e.g., based on a request from a user device or based on a location of the user device) and based on the physical object data. For example, an algorithm may be used for determining the mm wave transmission path. The algorithm may be an adaptive learning algorithm utilized as part of a beamforming management procedure, the adaptive learning algorithm being adaptable over time based on learning from user device feedback associated with received mm wave signals. For example, the adaptive learning algorithm can be trained based on feedback from a lab environment and continuously updated during base station and user device deployment (e.g., in an urban setting). In embodiments, the algorithm is a deep reinforcement learning based beamform management algorithm that utilizes machines learning and an artificial neural network to update and apply a predictive model for beam selection and mm wave transmission during a beamforming management procedure. For example, the adaptive learning algorithm can learn from mm wave transmissions within a particular environment (e.g., a particular city or portion thereof). In some embodiments, the adaptive learning algorithm can be used to build a user device codebook for beam indications of a beam management procedure.

In some embodiments, the adaptive learning is performed using a deep belief network of probabilistic models having multiple layers of hidden nodes, which may be obtained by stacking layers of restricted Boltzmann machines (artificial neural networks that learn a probability distribution over a set of inputs). In some embodiments, the adaptive learning is performed using a deep convolutional network trained using supervised learning. For example, the predictive model can be generated based on mm wave transmissions reflecting and refracting from various physical objects in a controlled environment.

In some embodiments, the mm wave transmission path can be determined based on the external material data for a physical object within a coverage area (e.g. within a sector footprint) and a reflection of the mm wave signal on external material of the physical object. For example, the mm wave transmission path is determined based on a predicted reflection angle from a particular location on the external material of the physical object, and the predictive model can be updated based on the actual reflection angle from the external material to the user device based on user device feedback. Additionally or alternatively, the mm wave transmission path can be determined based on the external material data for another physical object within the coverage area and a refraction of the mm wave signal through the other physical object. For example, the adaptive learning algorithm can be used to predict a refraction index associated with the external material of the physical object in which the mm wave signal is predicted to refract, and a predicted refraction angle can be used for determining the mm wave transmission path to the user device.

In embodiments, the adaptive learning algorithm can be used to determine a plurality of mm wave transmission paths (e.g., a first mm wave transmission path and a second mm wave transmission path) based on one or more locations of one or more user devices and the physical object data for the physical objects within a sector, or portion thereof, of a coverage area. In embodiments, the first mm wave transmission path can be determined based on a first physical object having a first external material, identified from the physical object data, which is different from a second external material of a second physical object. For example, the different external materials may result in differing reflection angles or differing refraction angles. As another example, the different external materials may result in differing displacement amplitudes. Continuing this example, the second mm wave transmission path may be determined based on the second external material of the second physical object. In some embodiments, the first mm wave transmission path is determined based on a reflection of a mm wave signal on the first external material, and the second mm wave transmission path is determined based on a refraction of another mm wave signal on the second external material. In other embodiments, the first mm wave transmission path is determined based on a refraction of the mm wave signal on the first external material.

At 308, one or more mm wave signals are transmitted from one or more antenna elements (e.g., of a base station) based on the determined transmission path. In embodiments, the transmission path corresponds to an antenna transmission power, one or more frequency beams, one or more frequency beam patterns, one or more beam weights, one or more particular directions, another type of transmission path determination, or one or more combinations thereof. In some embodiments, the mm wave transmission path corresponds to a beam sweeping operation. In some embodiments, a mm wave transmission path is associated with a sector sweep having a wide-formed beam for one connection with the user device and another mm wave transmission path is associated with a refined and narrower beam. In some embodiments, the antenna elements leverage an analog port, a digital port, or one or more combinations thereof, for transmission of one or more mm wave signals. In some embodiments, the mm wave transmission corresponds to a particular elevation across one or more tones and an elevation level of the user device.

At 310, feedback is received from the user device based on one or more mm wave transmissions. For example, the feedback may include one or more of an incident angle, reflection angle, refraction angle, delay between transmission and receipt associated with the mm wave signal, antenna power of the antenna elements transmitting the one or more mm wave signals, separation distance between the user device and physical object, separation distance between the user device and antenna elements transmitting the one or more mm wave signals, separation distance between the antenna elements and the physical object, locations of the user device and antenna elements, an external temperature associated with the environment in which the mm wave transmitted from the antenna elements to the user device, velocity of the mm wave transmitted, velocity of the mm wave signal received by the user device, displacement amplitude, intensity associated with the mm wave at transmission, intensity of the mm wave signal received, permittivity of the reflective surface of the physical object in which the mm wave signal reflected or refracted, measured reflection coefficients, reflection loss, refraction loss, mm wave signal pattern, partition loss, SRS, RSRP measurements, other types of feedback, or one or more combinations thereof. Based on the feedback received from the user device, the mm wave transmission path can be adjusted.

For example, in some embodiments, the mm wave transmission path is adjusted using the adaptive learning algorithm and one or more SRSs received from the user device. As another example, the mm wave transmission path can be adjusted using one or more RSRP measurements received from the user device. In yet another example, the mm wave transmission path can be adjusted using one or more velocities of the mm wave signal received by the user device, displacement amplitudes, measured intensity of the mm wave signal received by the user device, measured reflection coefficients, reflection loss, refraction loss, partition loss, other types of feedback, or one or more combinations thereof. As such, the adjusted mm wave transmission path can be used for transmitting one or more additional mm wave signals to the user device.

Example User Device

Having described the example embodiments discussed above of the presently disclosed technology, an example operating environment of an example user device (e.g., user device 102A of FIG. 1) is described below with respect to FIG. 4. User device 400 is but one example of a suitable computing environment, and is not intended to suggest any particular limitation as to the scope of use or functionality of the technology disclosed. Neither should user device 400 be interpreted as having any dependency or requirement relating to any particular component illustrated, or a particular combination of the components illustrated in FIG. 4.

Figure 4:
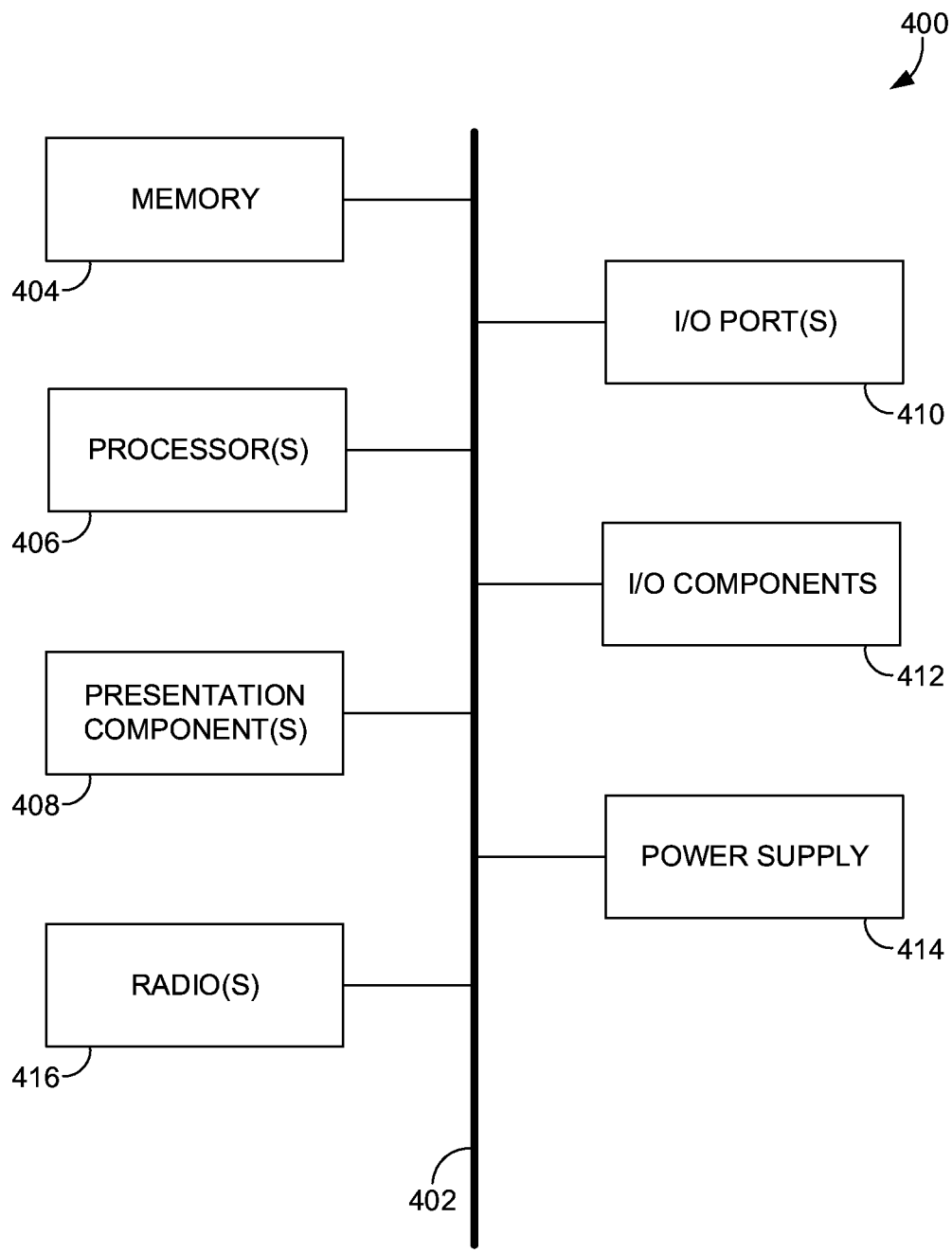
FIG. 4 depicts an example user device suitable for use in implementations of the present disclosure, in accordance with aspects herein.

As illustrated in FIG. 4, example user device 400 includes a bus 402 that directly or indirectly couples the following devices: memory 404, one or more processors 406, one or more presentation components 408, one or more input/output (I/O) ports 410, one or more I/O components 412, a power supply 414, and one or more radios 416.

Bus 402 represents what may be one or more busses (such as an address bus, data bus, or combination thereof). Although the various blocks of FIG. 4 are shown with lines for the sake of clarity, in reality, these blocks represent logical, not necessarily actual, components. For example, one may consider a presentation component, such as a display device, to be an I/O component. Also, processors have memory. Accordingly, FIG. 4 is merely illustrative of an exemplary user device that can be used in connection with one or more embodiments of the technology disclosed herein.

User device 400 can include a variety of computer-readable media. Computer-readable media can be any available media that can be accessed by user device 400 and may include both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by user device 400. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. One or more combinations of any of the above should also be included within the scope of computer-readable media.

Memory 404 includes computer storage media in the form of volatile and/or nonvolatile memory. The memory 404 may be removable, non-removable, or a combination thereof. Example hardware devices of memory 404 may include solid-state memory, hard drives, optical-disc drives, other hardware, or one or more combinations thereof. As indicated above, the computer storage media of the memory 404 may include RAM, Dynamic RAM, ROM, EEPROM, flash memory or other memory technology, CD-ROM, a cache memory, DVDs or other optical disk storage, magnetic cassettes, magnetic tape, magnetic disk storage or other magnetic storage devices, a short-term memory unit, a long-term memory unit, any other medium which can be used to store the desired information and which can be accessed by user device 400, or one or more combinations thereof.

The one or more processors 406 of user device 400 can read data from various entities, such as the memory 404 or the I/O component(s) 412. The one or more processors 406 may include, for example, one or more microprocessors, one or more CPUs, a digital signal processor, one or more cores, a host processor, a controller, a chip, a microchip, one or more circuits, a logic unit, an integrated circuit (IC), an application-specific IC (ASIC), any other suitable multi-purpose or specific processor or controller, or one or more combinations thereof. In addition, the one or more processors 406 can execute instructions, for example, of an operating system of the user device 400 or of one or more suitable applications.

The one or more presentation components 408 can present data indications via user device 400, another user device, or a combination thereof. Example presentation components 408 may include a display device, speaker, printing component, vibrating component, another type of presentation component, or one or more combinations thereof. In some embodiments, the one or more presentation components 408 may comprise one or more applications or services on a user device, across a plurality of user devices, or in the cloud. The one or more presentation components 408 can generate user interface features, such as graphics, buttons, sliders, menus, lists, prompts, charts, audio prompts, alerts, vibrations, pop-ups, notification-bar or status-bar items, in-app notifications, other user interface features, or one or more combinations thereof.

The one or more I/O ports 410 allow user device 400 to be logically coupled to other devices, including the one or more I/O components 412, some of which may be built in. Example I/O components 412 can include a microphone, joystick, game pad, satellite dish, scanner, printer, wireless device, and the like. The one or more I/O components 412 may, for example, provide a natural user interface (NUI) that processes air gestures, voice, or other physiological inputs generated by a user. In some instances, the inputs the user generates may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with the one or more presentation components 408 on the user device 400. In some embodiments, the user device 400 may be equipped with one or more imaging devices, such as one or more depth cameras, one or more stereoscopic cameras, one or more infrared cameras, one or more RGB cameras, another type of imaging device, or one or more combinations thereof, (e.g., for gesture detection and recognition). Additionally, the user device 400 may, additionally or alternatively, be equipped with accelerometers or gyroscopes that enable detection of motion. In some embodiments, the output of the accelerometers or gyroscopes may be provided to the one or more presentation components 408 of the user device 400 to render immersive augmented reality or virtual reality.

The power supply 414 of user device 400 may be implemented as one or more batteries or another power source for providing power to components of the user device 400. In embodiments, the power supply 414 can include an external power supply, such as an AC adapter or a powered docking cradle that supplements or recharges the one or more batteries. In aspects, the external power supply can override one or more batteries or another type of power source located within the user device 400.

Some embodiments of user device 400 may include one or more radios 416 (or similar wireless communication components). The one or more radios 416 can transmit, receive, or both transmit and receive signals for wireless communications. In embodiments, the user device 400 may be a wireless terminal adapted to receive communications and media over various wireless networks. User device 400 may communicate using the one or more radios 416 via one or more wireless protocols, such as code division multiple access ("CDMA"), global system for mobiles ("GSM"), time division multiple access ("TDMA"), another type of wireless protocol, or one or more combinations thereof. In embodiments, the wireless communications may include one or more short-range connections (e.g., a Wi-Fi® connection, a Bluetooth connection, a near-field communication connection), a long-range connection (e.g., CDMA, GPRS, GSM, TDMA, 802.16 protocols), or one or more combinations thereof. In some embodiments, the one or more radios 416 may facilitate communication via radio frequency signals, frames, blocks, transmission streams, packets, messages, data items, data, another type of wireless communication, or one or more combinations thereof. The one or more radios 416 may be capable of transmitting, receiving, or both transmitting and receiving wireless communications via mm waves, FD-MIMO, massive MIMO, 3G, 4G, 5G, 6G, another type of Generation, 802.11 protocols and techniques, another type of wireless communication, or one or more combinations thereof.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software. For instance, various functions may be carried out by a processor executing instructions stored in memory. As such, other arrangements and elements (for example, machines, interfaces, functions, orders, and groupings of functions, and the like) can be used in addition to, or instead of, those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and subcombinations and are contemplated within the scope of the claims.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for enhancing millimeter (mm) wave coverage within a wireless telecommunications network, the system comprising:
   one or more processors communicatively coupled with a plurality of antenna elements that provide a coverage area; and
   computer memory storing computer-usable instructions that, when executed by the one or more processors, cause the system to perform operations comprising:
   receiving physical object data for physical objects within a sector of the coverage area provided by the plurality of antenna elements;
   identifying a location of a user device within the sector of the coverage area;
   determining, using an algorithm, a mm wave transmission path based on the location of the user device and the physical object data for the physical objects within the sector; and
   transmitting a mm wave signal for the user device to receive based on the determined mm wave transmission path.

2. The system according to claim 1, the physical object data comprising location data and external material data for each of the physical objects.

3. The system according to claim 1, wherein the algorithm is an adaptive learning algorithm.

4. The system according to claim 3, the operations further comprising:
   receiving an Reference Signal Received Power (RSRP) measurement from the user device based on the user device receiving the mm wave signal transmitted; and
   adjusting the mm wave transmission path for another mm wave signal using the adaptive learning algorithm and the RSRP measurement.

5. The system according to claim 2, wherein the mm wave transmission path is determined based on the external material data for a physical object within the sector and a reflection of the mm wave signal on external material of the physical object.

6. The system according to claim 5, wherein the mm wave transmission path is determined based on the external material data for another physical object within the sector and a refraction of the mm wave signal through the other physical object.

7. The system according to claim 3, the operations further comprising:
receiving a Sound Reference Signal (SRS) from the user device based on the user device receiving the mm wave signal transmitted;
adjusting the mm wave transmission path using the adaptive learning algorithm, the SRS, the location of the user device, and the physical object data; and
transmitting a plurality of mm wave signals based on the adjusted mm wave transmission path.

8. The system according to claim 1, wherein the physical object data comprises external material data for each of the physical objects and surface area dimensions for each external surface of each of the physical objects.

9. A method for enhancing millimeter (mm) wave coverage within a wireless telecommunications network, the method comprising:
receiving physical object data for physical objects within a sector of a coverage area provided by a plurality of antenna elements, each of the plurality of antenna elements being within a threshold distance from at least one of the plurality of antenna elements;
identifying a location of a user device within the sector of the coverage area;
determining, using an adaptive learning algorithm, a first mm wave transmission path and a second mm wave transmission path based on the location of the user device and the physical object data for the physical objects within the sector; and
transmitting a first mm wave signal and a second mm wave signal for the user device to receive, the first mm wave signal transmitted based on the first mm wave transmission path and the second mm wave signal transmitted based on the second mm wave transmission path.

10. The method according to claim 9, wherein the first mm wave transmission path is determined based on a first physical object having a first external material, identified from the physical object data, which is different from a second external material of a second physical object.

11. The method according to claim 10, wherein the second mm wave transmission path is determined based on the second external material of the second physical object.

12. The method according to claim 11, wherein the first mm wave transmission path is determined based on a reflection of the first mm wave signal on the first external material and the second mm wave transmission path is determined based on a refraction of the second mm wave signal on the second external material.

13. The method according to claim 9, further comprising:
receiving a Sounding Reference Signal (SRS) and a Reference Signal Power (RSRP) measurement from the user device based on the user device receiving the first mm wave signal;
adjusting the first mm wave transmission path using the adaptive learning algorithm, the SRS and the RSRP measurement, the location of the user device, and the physical object data; and
transmitting a mm wave signal based on the adjusted first mm wave transmission path.

14. The method according to claim 13, the method further comprising:

receiving an SRS and an RSRP measurement from the user device based on the user device receiving the second mm wave signal;
adjusting the second mm wave transmission path using the adaptive learning algorithm, the SRS and the RSRP measurement associated with the second mm wave signal, the location of the user device, and the physical object data; and
transmitting another mm wave signal based on the adjusted second mm wave transmission path.

15. One or more non-transitory computer storage media having computer-executable instructions embodied thereon, that when executed by at least one processor, cause the at least one processor to perform a method comprising:
identifying a location of a user device within a sector of a coverage area provided by a plurality of antenna elements, each the plurality of antenna elements within a threshold distance from at least one of the plurality of antenna elements;
based on identifying the location of the user device, retrieving, from a database, physical object data for physical objects within the sector of the coverage area;
determining, using an algorithm, a mm wave transmission path based on the location of the user device and the physical object data retrieved from the database; and
transmitting a mm wave signal based on the determined mm wave transmission path.

16. The one or more non-transitory computer storage media of claim 15, the method further comprising:
identifying at least two physical objects between at least one of the plurality of antenna elements and the user device;
retrieving the physical object data for the at least two physical objects, the physical object data for the at least two physical objects including an external material for each of the at least two physical objects;
determining, using the algorithm, a plurality of mm wave transmission paths based on the location of the user device and the physical object data for the at least two physical objects; and
transmitting a plurality of mm wave signals based on the determined plurality of mm wave transmission paths.

17. The one or more non-transitory computer storage media of claim 15, wherein the mm wave transmission path is determined based on a reflection from a first surface of a first physical object between at least one of the plurality of antenna elements and the user device, and wherein the physical object data includes an external material of the first surface and dimensions of the first surface.

18. The one or more non-transitory computer storage media of claim 15, the method further comprising:
identifying a second location of a second user device within the sector of the coverage area, the second user device within a threshold distance from the user device;
determining, using the algorithm, a second mm wave transmission path for the second user device based on the second location and the physical object data for the physical objects within the sector;
transmitting a second mm wave signal for the second user device to receive, the second mm wave signal transmitted based on the second mm wave transmission path determined;
receiving a Sounding Reference Signal (SRS) and a Reference Signal Power (RSRP) measurement from the user device and the second user device based on transmitting the mm wave signal and the second mm wave signal;

adjusting the mm wave transmission path and the second mm wave transmission path using an adaptive learning algorithm and the SRS and the RSRP measurement received from the user device and the second user device; and transmitting a plurality of mm wave signals based on the adjusted mm wave transmission path and the second mm wave transmission path.

19. The one or more non-transitory computer storage media of claim 15, wherein the mm wave transmission path is determined based on a refraction through a first physical object between at least one of the plurality of antenna elements and the user device, and wherein the physical object data includes an external material of the first physical object.

20. The one or more non-transitory computer storage media of claim 15, wherein the mm wave transmission path is determined based on:

a reflection from a first surface of a first physical object between at least one of the plurality of antenna elements and the user device, and wherein the physical object data includes an external material of the first surface; and a refraction from a second surface of a second physical object between at least one of the plurality of antenna elements and the user device, and wherein the physical object data includes an external material of the second surface.

\* \* \* \* \*